(12) United States Patent
Howard

(10) Patent No.: US 7,451,589 B2
(45) Date of Patent: Nov. 18, 2008

(54) LINE PROTECTING APPARATUS

(75) Inventor: Peter Howard, Lilli Pilli (AU)

(73) Assignee: ACT (Europe) Ltd., Nottinghamshire (GB)

( * ) Notice: Subject to any disclaimer, the term of this patent is extended or adjusted under 35 U.S.C. 154(b) by 0 days.

(21) Appl. No.: 11/576,995

(22) PCT Filed: Oct. 12, 2005

(86) PCT No.: PCT/AU2005/001570

§ 371 (c)(1),
(2), (4) Date: Oct. 30, 2007

(87) PCT Pub. No.: WO2006/039750

PCT Pub. Date: Apr. 20, 2006

(65) Prior Publication Data

US 2008/0060339 A1    Mar. 13, 2008

(30) Foreign Application Priority Data

Oct. 13, 2004    (AU) .............................. 2004905923

(51) Int. Cl.
*F16G 13/16*    (2006.01)
(52) U.S. Cl. ........................... 59/78.1; 59/900; 248/49; 248/51
(58) Field of Classification Search ................ 59/78.1, 59/900; 248/49, 51
See application file for complete search history.

(56) References Cited

U.S. PATENT DOCUMENTS 3,197,954 A * 8/1965 Merker et al. ................ 59/78.1
3,779,003 A * 12/1973 Boissevain et al. ........... 59/78.1
4,669,507 A    6/1987 Moritz
4,833,876 A    5/1989 Kitao et al.
5,243,814 A * 9/1993 Hart ............................. 248/49
6,387,002 B1 * 5/2002 Gunter ........................ 59/900
6,925,795 B2 * 8/2005 Komiya ....................... 59/78.1
6,945,027 B2 * 9/2005 Blase .......................... 248/51

FOREIGN PATENT DOCUMENTS

| GB | 2257492 | 1/1993 |
| GB | 2284033 | 5/1995 |
| WO | 20030095797 | 11/2003 |

\* cited by examiner

*Primary Examiner*—David B Jones
(74) *Attorney, Agent, or Firm*—Karl Bozicevic; Bozicevic, Field & Francis LLP

(57) ABSTRACT

A cable handler link (10) includes a body portion (12) having a first wall and two opposed side arms integral with and extending generally perpendicular to the first wall defining a first channel for receiving one or more service lines. The side arms define free ends, are capable of being deflected and each defines a first engaging formation in the form of a rebate (60). A closure means (14) includes an end wall (14) from which extend two relatively shorter side arms (16, 17) defining complementary engaging formations including a tenon (62) for interlocking the closure means to the side arms of the body portion (12). The side arms deflect towards each other to disengage the closure means from the body portion (12). The rebate (60) and tenon (62) are preferably slightly inwardly tapered and prevent relative transverse movement of the components, which is also the direction in which the link is towed, in use.

28 Claims, 5 Drawing Sheets

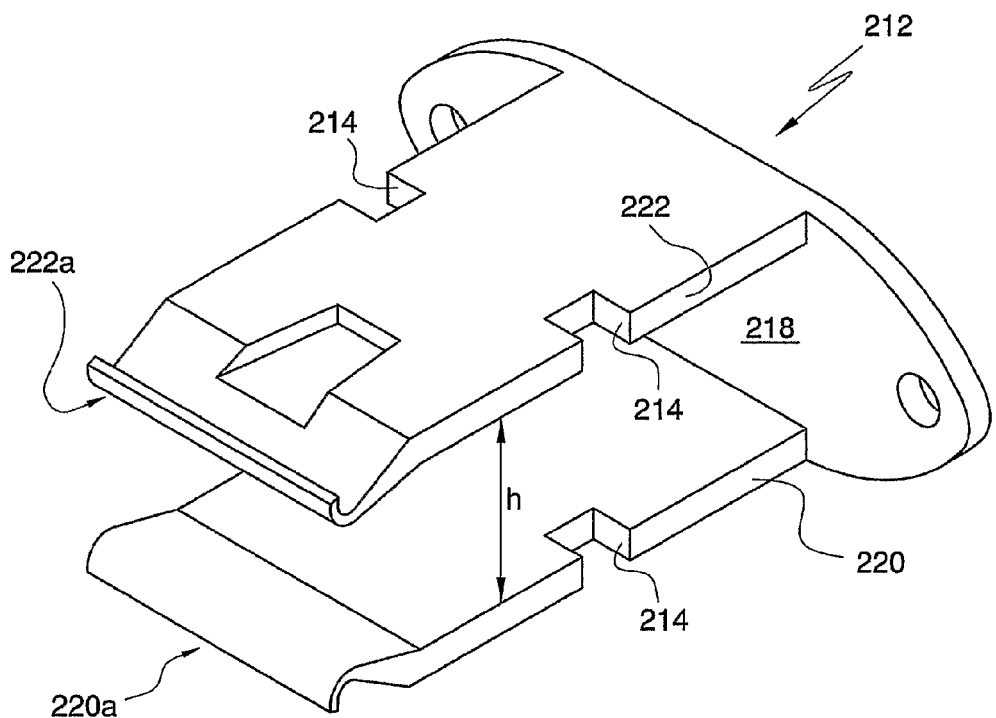
Fig.8
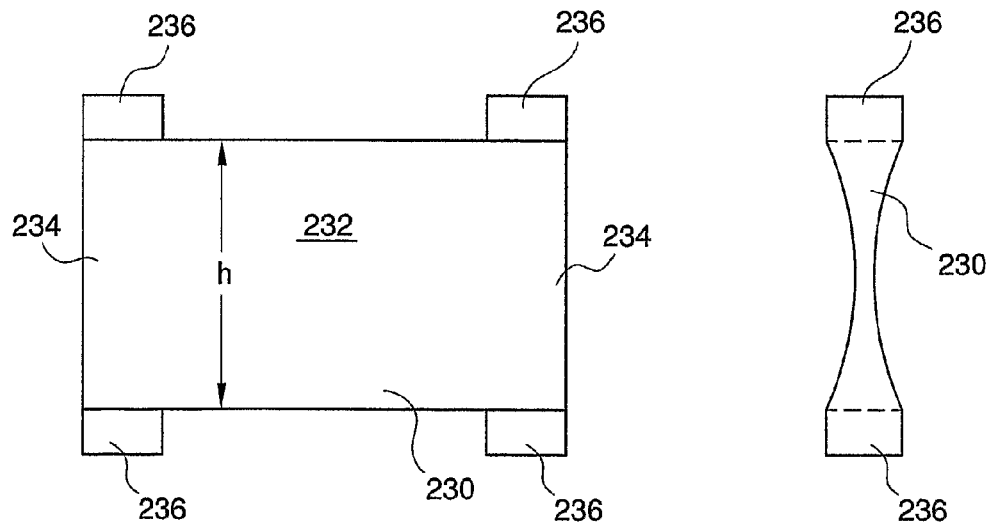
Fig.9                  Fig.10

LINE PROTECTING APPARATUS

CROSS-REFERENCES

This application is a 371 National Phase of International Patent Application Ser. No. PCT/AU2005/001570 filed Oct. 12, 2005 which claims the benefit of priority to Australian Patent Application Serial No. 2004905923 filed Oct. 13, 2004, both of which are incorporated herein by reference in their entirety noting that the current application controls to the extent there is any contradiction with any earlier applications and to which applications we claim priority.

FIELD OF THE INVENTION

This invention relates to an apparatus for protecting cables, water lines and the like (hereinafter referred to as lines or service lines), particularly, but not exclusively, in underground workings.

BACKGROUND OF THE INVENTION

During mining operations it is necessary to protect a variety of electrical cables, water hoses and other service lines from damage. One particular area where line protecting apparatus is required, is in the area of coal mining, particularly in longwall coal mining in which a coal cutter traverses back and forth across a coal face depositing coal cut from the coal face into a conveyor disposed behind the coal cutter. In order to operate, the coal cutter requires a supply of water and electricity, which are provided by service lies. The service lines are located in a trough which is typically disposed on the opposite side of the conveyor from the coal cutter and the lines travel up and down the trough as the coal cutter moves up and down the coal face. It should be noted however, that whilst the type of apparatus envisaged by the present invention is particularly suitable for use in handling and protecting service lines for longwall coal mining, other applications of the apparatus are possible.

In order to protect such service lines, it is known to enclose, or at least partially enclose them in a protective articulated cable handler formed from a plurality of interconnected links. U.S. Pat. No. 4,988,838 discloses one such cable handler formed from a plurality of interconnected links. Each link has a central web forming a common base for a pair of laterally open channels on respective sides of the central web. For at least some of the links, each channel is formed with a inwardly extending nib so that the entrance to the channel is narrower than the width of the channel. Each link is formed from a plastics material, typically nylon, so that the channel sides are resiliently flexible and a service line can be inserted into a respective one of the channels by deflecting walls of the channel and the nibs apart. After a service line is passed through the channel entrance, the channel sides return back to regain their original position and thus prevent the line from inadvertently moving out of the channel. The links are joined by linking the central web of one link to adjacent links hence such cable handlers are referred to as "centre pull" cable handlers. Centre pull cable handlers also preferred because the water hose is kept separate from the electric cable for safety & reliability reasons.

PCT/GB95/00384 discloses a development of the apparatus shown in U.S. Pat. No. 4,988,838 in which the web is located to one side of the link instead of being centrally located, and the channel is approximately twice the depth of the centre pull design. This type of cable handler is referred to as a "side pull" cable handler, as the links are articulated via the side web and are pulled along one side only.

One problem which is common to the cable handlers of both U.S. Pat. No. 4,988,838 and PCT/GB95/00384 results from the presence of stones, flints and the like in the trough along which the cable handler runs. These flints and stones are often narrower than the channel entrance and they can enter the channel and may puncture the water hose or electric cable, thus interrupting the supply of power or water to the coat cutter and disrupting production. Further, the type of heavy duty cables used in underground mining are expensive, particularly the electric cables. The cost of replacing any damaged cables, is high, such that in some environments, mining operators will not use cable handlers of the type described in U.S. Pat. No. 4,988,838 because of the potential for damage to the service lies.

To avoid this problem twin pull cable handlers have been developed and are currently used at many longwall operations, particularly in the USA, Australia and the UK. In a twin pull cable handler, each link defines a generally rectangular shaped box in which the electric cable and water line are located. The water hose is not kept separate from the electric cable as with the centre pull design. A removable plate or plates are bolted or otherwise fixed to the tops of the side walls of the rectangle, thereby locking the cables in the U shaped link. The base, side walls, and plate are all solid providing all round protection for the electric cable and water line. The links may be linked/pulled from either or both sides, and are typically pulled from both sides, hence the name "twin pull". However, whilst such a twin pull design provides a high degree of protection for cables, it will be appreciated that it is an extremely lengthy, tedious and time consuming process to install a pair of lines in a twin pull cable handler compared to a centre pull cable handler such as in U.S. Pat. No. 4,988,838 or a side pull cable handler, because of the need to attach a plate to each link in turn. For a typical longwall mine which might require a cable handler which is many metres long, this may take many hours, even days, and will result in loss of operating time. There is also the risk of the bolts, clips or the like securing the plates to the channels, becoming loose and separating from the channel. It will also be appreciated that, because the links have to be articulated to allow the cable to fold back upon itself, as the coal cutter traverses up and down the coal face, however the cable handler is designed, it is impossible to totally enclose the cables In a cable handler which is made of articulated rigid protective elements, as gaps are required between links to allow articulation.

International Patent Application publication number WO 03/095797 discloses one attempted solution to this problem. The links of the cable handler disclosed in that publication define a channel having an end wall and flexible side walls for receiving at least one, and typically two service lines. Engaging formations are defined on the free ends of the side walls and a second end wall plate defining engaging formations adapted to engage with the engaging formations of the side wall is provided. Engagement between engaging formations is enabled by flexing of the side walls to securely engage the second end wall between the side arms thus preventing movement of the second end wall relative to the side walls, absent flexure of the side walls. At least one, and preferably both, of the end walls is provided with pivotal formations to enable the chain link to be pivotally connected to a similar link to form a chain. Although, in theory, the design of WO 03/095797 should provide good protection for cables against a the presence of stones, flints and like in the trough, in practice it has been found that the end wall plates are not securely retained in the line of maximum parting force between the side walls in all conditions, and the end wall could possibly disengage from the rest of the link, in use. Further in the design shown in WO 03/095797, the water hose is not kept separate from the electric cable.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first aspect there is provided a link of a chain link for protecting cables, service lines and the like comprising:

a body portion having a first wall and two opposed side arms integral with the first end wall extending away from one side of the first wall and defining at least one channel for receiving at least one service line, the side arms having free ends and being capable of being deflected, the end walls defining first engaging formations; and a closure means defining an end wall, the end wall defining complementary engaging formations to the first engaging formations for interlocking the end wall to the first component characterised in that the engaging formations are such the side arms of the body portion are deflected towards each other to disengage the closure means from the body portion.

The closure means may comprise an end wall from which extend relatively shorter side arms on which the complementary engaging formations are defined.

Typically the engaging formations include a rebate defined in the free end of each side arm and a key or tenon defined at the free end of each relatively shorter side arm. The rebate and key are preferably slightly inwardly tapered. The key and rebate prevent relative transverse movement of the components, which is also the direction in which the link is towed, in use.

The engaging formations may also include a channel extending transversely across the width of one of the shorter side arms or the longer side arms and a depending rib extending transversely across the width of the other of the shorter side arms or the side walls. Preferably the channel is defined on the side walls adjacent the rebate.

In one preferred embodiment the body portion defines two channels extending from opposite sides of the first wall. In this embodiment, the two channels each define engaging formations for receiving a respective closure means defining shorter side arms on which complementary engaging formations are defined. Both the first wall of the body portion and both end walls of the two closure means typically include linkage means so that the links may be connected in the centre and at both sides.

For twin pull or side pull links where the water and electrical cables would ordinarily be carried in the same channel a separator may be provided which snap-fits into the channel to separate the two cables. The separator may have a hour glass like cross-section being narrower at its middle than its top and bottom.

BRIEF DESCRIPTION OF THE DRAWINGS

A specific embodiment of the present invention will now be described by way of example only with reference to the accompanying drawings in which:

FIG. 8 is a perspective view of a fourth embodiment of a chain link for a line protecting apparatus embodying the present invention;

FIG. 9 is a side view of a cable separator for use with the fourth embodiment show in FIG. 8; and FIG. 10 is an end view of the cable separator of FIG. 9.

DETAILED DESCRIPTION OF THE PREFERRED EMBODIMENT

Figure 1:
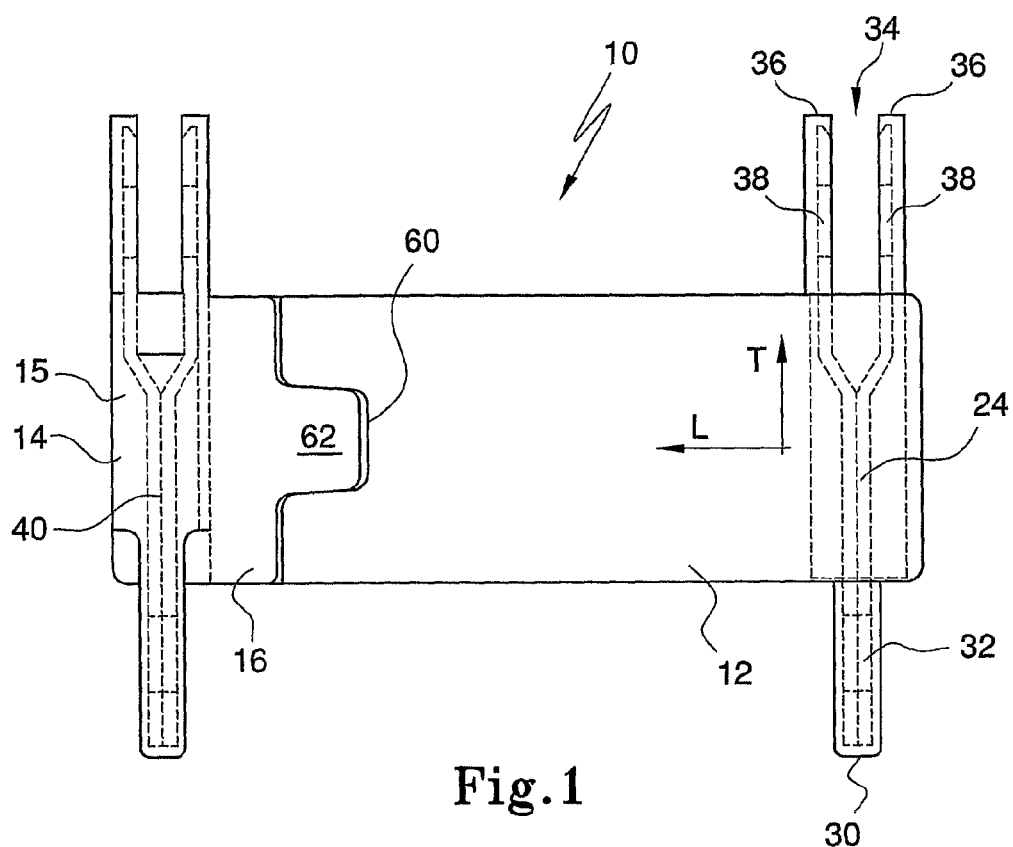
FIG. 1 is a schematic top plan view of a first embodiment of a chain link for a line protecting apparatus embodying the present invention comprising first and second interlocked components.

Referring to the drawings, FIGS. 1 to 4 show a first embodiment of a line protecting apparatus or chain link 10 which forms one link of an articulated chain. The chain link comprises two parts: a body portion in the form of a generally U-shaped channel element 12; and a detachable closure means 14 which defines an end wall 15 from which extend a pair of short side arms 16, 17. The U-shaped channel element 12 includes a first or end wall 18 and two identical opposed side arms or walls 20, 22, integral with the end wall and defining free ends 20a, 22a (best seen in FIG. 4).

The body portion 12 is formed from a moulded plastics material such as high viscosity nylon incorporating a steel insert 24 to provide additional strength and to provide linkage means. The side walls 20, 22 are not reinforced and are generally flexible.

The steel insert 24, which is not ordinarily visible being largely encased in nylon, but is best seen in FIG. 1, comprises two parallel cranked linkage elements. At one end 30, it defines a through aperture 32 and at the other end 34 defines two parallel arms 36 which define coaxial apertures 38. The relatively narrower portion 30 of one insert 24 can be inserted between the arms 36 of an adjacent insert and the inserts may be linked together with a bolt or other suitable means passing through the apertures 32 and 38.

Figure 2:
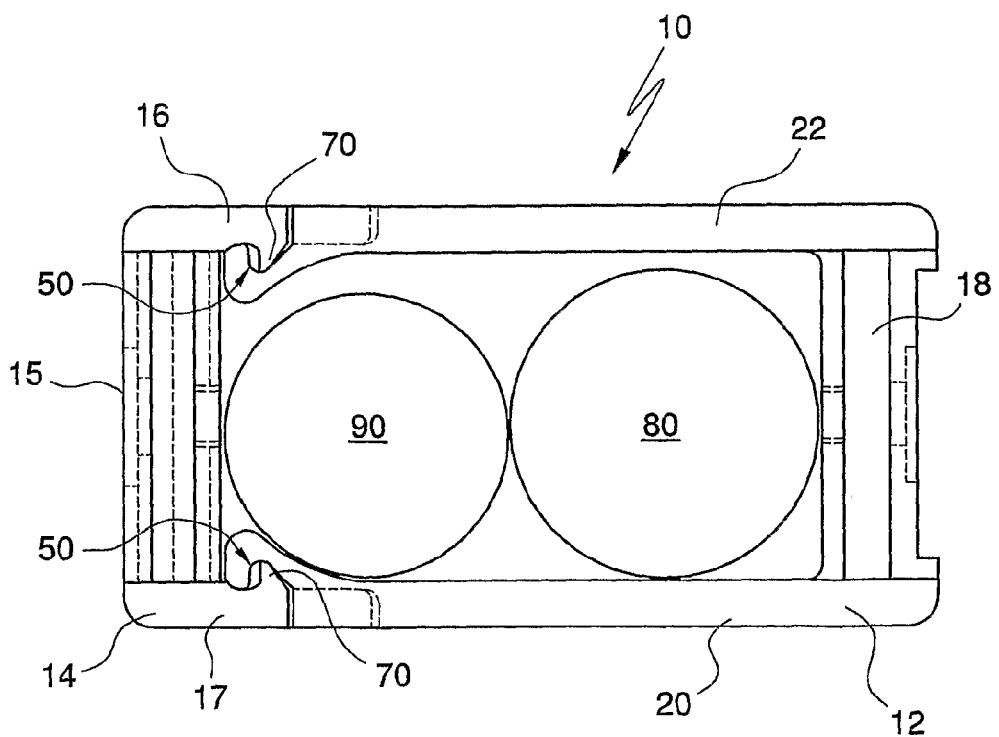
FIG. 2 is a schematic side view of the chain link of FIG. 1 showing the link holding two cables.

The closure means 14 is similar in design to the end wall of the U-shaped channel element 12 in that it is formed from a moulded plastics material, again typically high viscosity nylon incorporating a steel insert 40 of substantially the same shape and design as the insert 22 of the end wall 18, to provide additional strength and additional linkage means. Thus when the closure means 14 is attached to the channel means, as illustrated in FIGS. 1 and 2, a twin pull chain link is defined. The means by which the closure means 14 and the U-shaped channel element 12 are interlocked can be seen more clearly with reference to FIGS. 3 and 4.

The side walls 20, 22 of the channel element extend away from the end wall 18 in a longitudinal direction and define a generally rectangular cross-section transverse to their longitudinal extent. The side walls 20, 22 are parallel to one another and symmetrical about a longitudinally extending plane L extending between and parallel to the side walls. Typically they will be about 6 mm deep, although this depth may be varied. A channel 50 is defied in the outer face of each side wall 20, 22 adjacent each end 20a, 22a. Since the engagement means defined by the ends of the side walls are identical, one only on sidewall 22 will be described.

Figure 4:
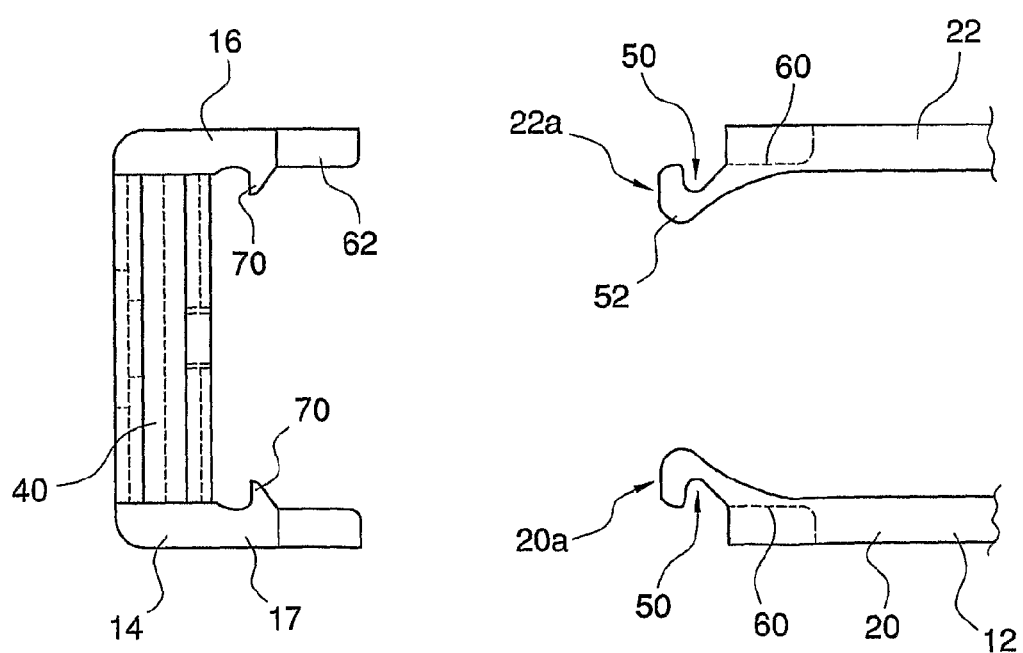
FIG. 4 is a schematic side view of the chain link of FIG. 1 with the first and second components separated to illustrate engaging formations on the components, showing one end only of the first component.

The channel 50 extends in a transverse direction from one side of the side wall 22 to the other. As is best seen in FIG. 4, the channel is defined in a U/J shaped thickened portion 52 defined at the end 22a of the arm in which the underside of the arm 22 is thickened to provide an increased depth of material underneath the channel 50. The base 52 of the channel 50 is typically about 8 mm deep relative to the outer surface of the side wall 20. This allows for wear of the top and bottom faces of the link, in use.

Figure 3:
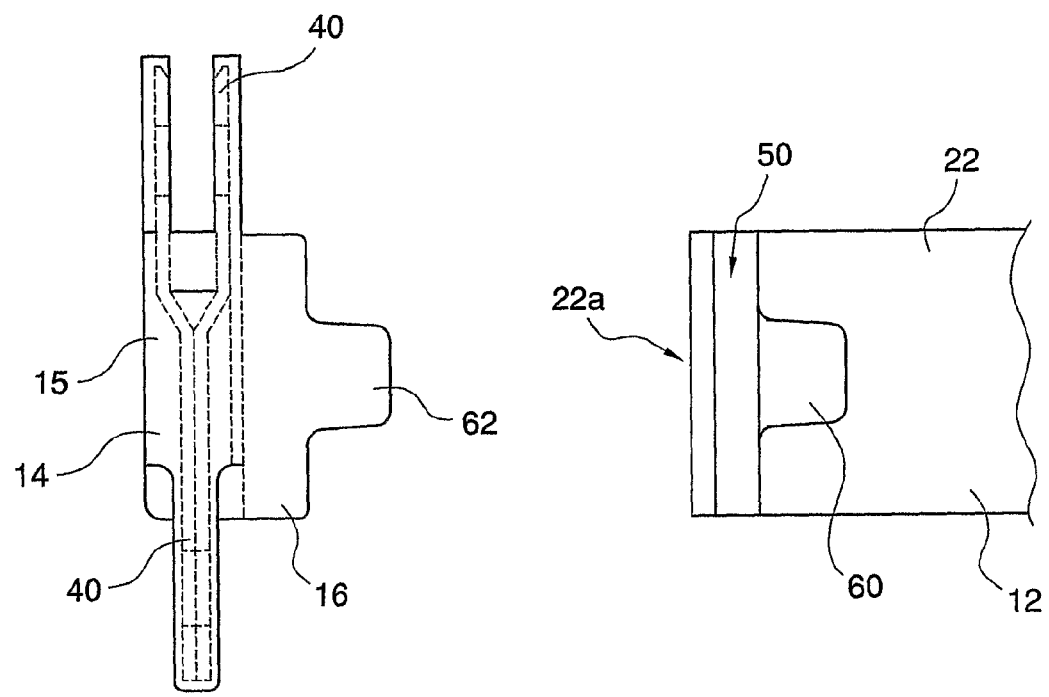
FIG. 3 is a schematic top plan view of the chain link of FIG. 1 with the first and second components separated to illustrate engaging formations on the components, and showing one end only of the first component.

As is best seen in FIG. 3 (and shown in phantom in FIG. 4), a generally rectangular slot or rebate 60 with slightly tapered walls is defined in the end of the side wall 22. The rebate extends from tie middle of the side wall of the channel 50, in the direction of the end wall 18. The walls taper gently towards each other in the direction of the end wall 18.

Complementary engaging formations which mate with the channel 50 and rebate 60 are defined on the end element 14. There is preferably zero tolerance/clearance between the inter-engaging formations to ensure a tight fit.

In particular, with reference to FIGS. 3 and 4, the short side arms 16, 17 of the closure means 14 each define a generally rectangular key or tenon element 62 with gently tapering sides which locates in the rebate 60 and prevents movement of the detachable end wall 14 in a transverse direction relative to the U-shaped channel element 12.

As is best seen in FIG. 4 each short side arm 16, 17 also defines an projecting rib 70 which, in use, locates in the channel 52 of the channel element 12 (see FIG. 2).

When the two components are interlocked as shown in FIGS. 1 and 2, the dovetail-type joint formed by the key 62 and rebate 60 prevents relative movement of the components in a transverse direction T. The channel 50 and rib prevents relative movement in a longitudinal direction L.

In order to engage the U-shaped element 12 and end element 14 together, the two elements 12 and 14 are pressed together with the rebate 60 and key 62 aligned. The flexible side walls 20, 22 flex towards each other, or may be pushed towards each other to facilitate inter-engagement. In use the link will carry service lines 80 and 90, for water and electricity, respectively shown in FIG. 2.

In order to disengage the detachable end wall 14 from the U-shaped channel element 12 the side arms 20, 22 of the U-shaped channel element are simply flexed towards each other and the two components 12, 14, separate relatively easily.

Advantageously however, because of the design of the engaging means, the engaging means are strongest in the direction of greatest magnitude of force which occurs during use of the chain link that the direction in which the links are pulled along. In use there is little tendency for forces to be applied pushing the side walls 20, 22 together hence little likelihood of the detachable end wall accidentally disengaging.

Figure 5:
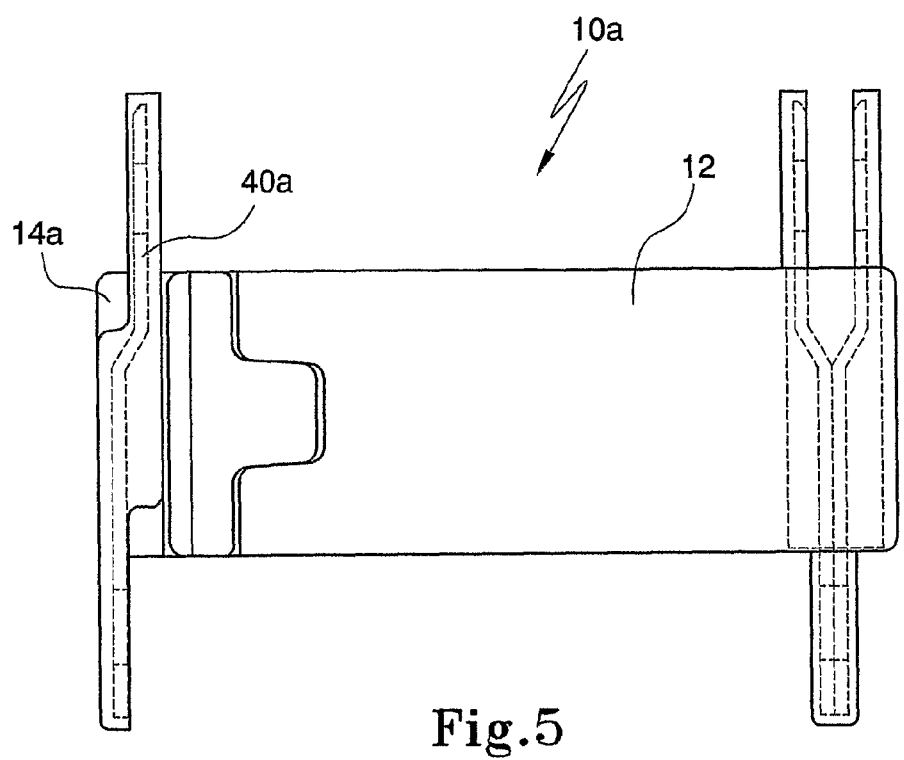
FIG. 5 is a schematic top plan view of a second embodiment of a chain link for a line protecting apparatus embodying the present invention.
Figure 6:
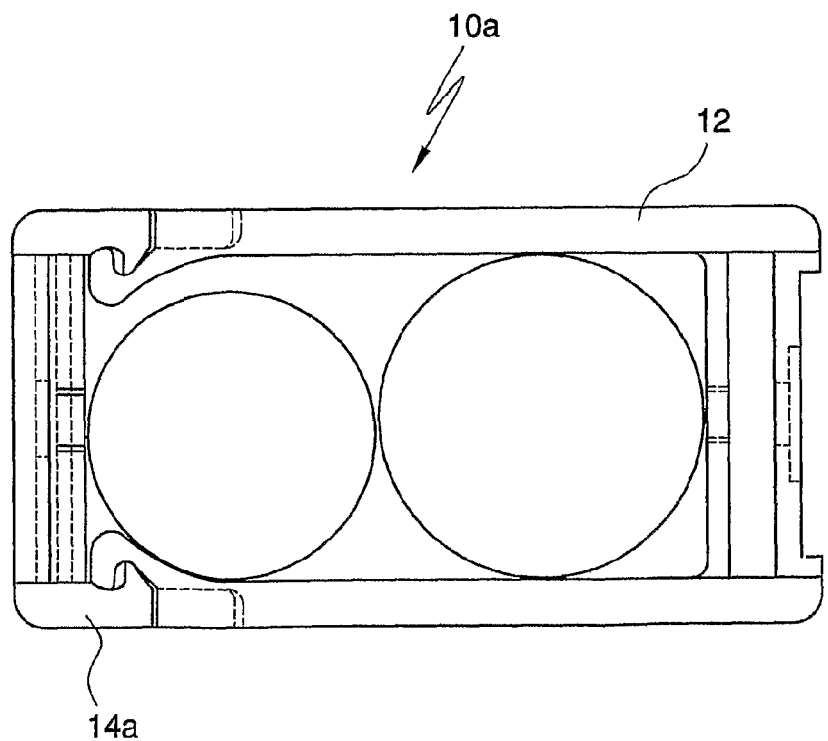
FIG. 6 is a schematic side view of the embodiment of chain link of FIG. 5 showing the link holding two cables.

FIGS. 5 and 6 show a variant 10 a of the link of FIGS. 1 to 4. The link 12 is the same as that of FIGS. 1 to 4. The closure means 14a, is slightly different from closure 14 as it includes only a single ranked like 40a rather than two parallel cranked linkage elements.

Although the above describes a link for a twin pull line protector, it will be appreciated that the same principals may be applied to produce side pull, centre pull or triple pull chain links. For a centre pull, side arms will extend out from both sides of the end wall 18, defining a channel for a water line, and a channel for a cable separated by the end wall, and the ends of those channels may be closed with end walls 14 which do not define linkage means.

Figure 7:
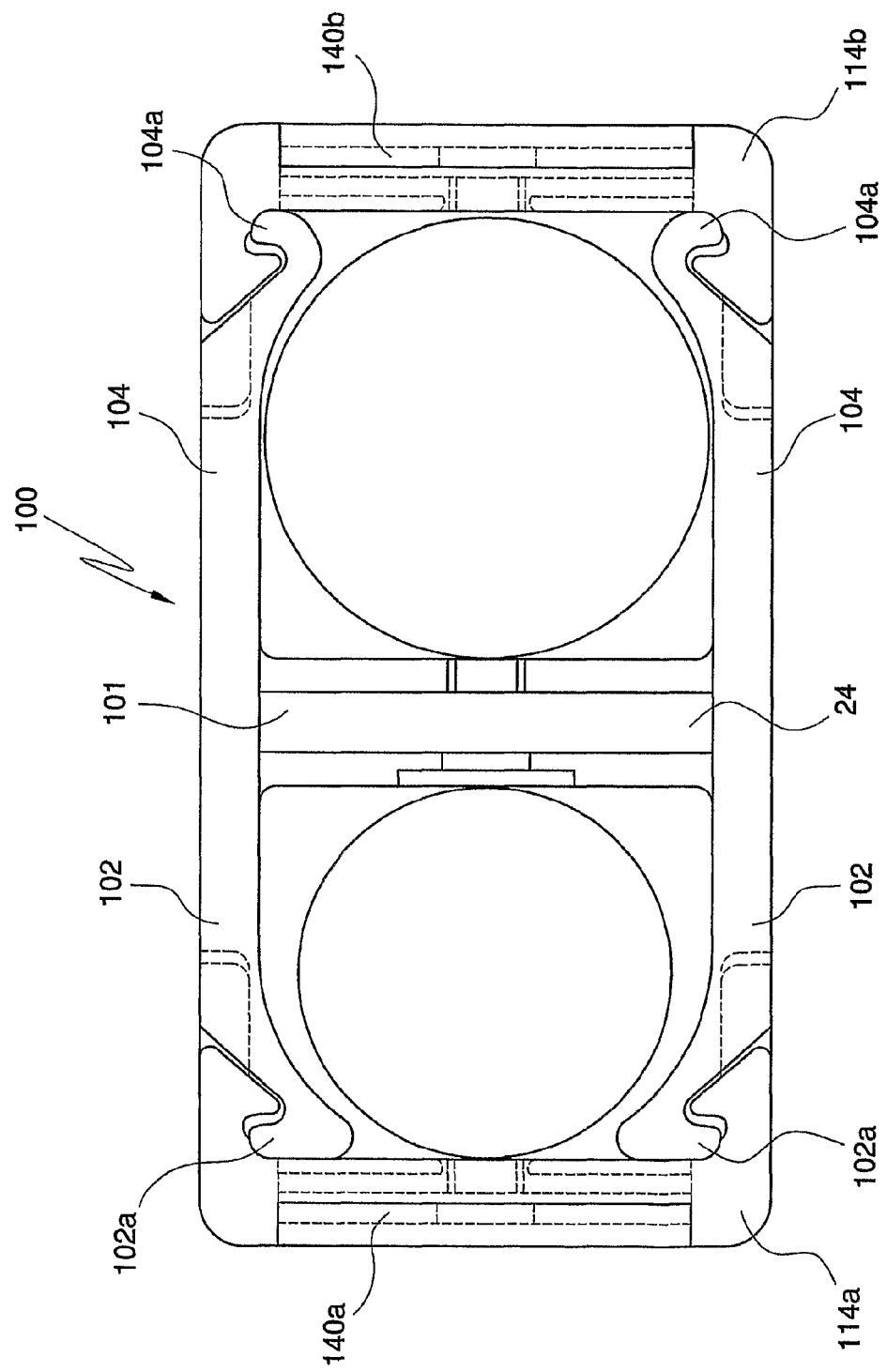
FIG. 7 is a general assembly of a third embodiment of a chain link for a rifle protecting apparatus, embodying the present invention.

FIG. 7 illustrates a triple or tri pull link 100. In this embodiment there is a central wall 101 and two pairs of parallel side arms 102, 104 extending away from either side of the central wall 101. Again a steel insert 24 which is not ordinarily visible being largely encased in nylon which comprises two parallel cranked linkage elements is embedded in the wall 101. The free ends 102a and 104a of the side arms are configured the same as the free ends 120a and 122a of the first and second embodiments and define engaging formations in the form of a channel and rebate. These engage closure means 114a, 114b which are substantially identical to the closure 14a of the embodiment of FIG. 5 although one is a mirror of the other. A single cranked linkage 140a, 140b is embedded in the end wall of each detachable closure 114a, 114b respectively. Using single shear cranked plates keeps the width of the link to an minimum.

In a yet further variant a side pull link can be provided by using the body portion 12 of the twin pull described above but with an end wall which does not define any linkage means.

FIGS. 8 to 10 illustrate a yet further variant incorporating a cable separator. FIG. 8 shows a perspective view of a body portion 212 of a twin pull separator of the type shown in FIGS. 1 and 2 but which differs from the body portion of FIGS. 1 and 2 in that a notch or cut-out 214 is formed in each outer edges of each side arms 220 and 222 approximately midway between the end wall 218 and the free ends 220a and 222a of the body portion. A cable separator 230 shown in FIGS. 9 and 10 is provided. The cable separator has a main body portion 232 which has a height h equal to the vertical gap between the side arms 220 and 222 and relatively higher ends 234 which define protrusions 236 from the body portion and extend above and depend below the main body portion. The protrusions snap or push fit into the notches 214 to secure the cable separator extending transversely across the link. As is best seen in FIG. 10 in cross-section the cable separator is thicker at its top and bottom and tapers towards its centre, in an hour glass like shape. Typically the link will be 20 mm thick or so at its top and bottom, and as little as 2 mm thick at its middle. In this way the strength and rigidity of the separator and link are maintained whilst keeping the overall width of the link measured from the end wall 218 of the body portion to the end wall of the closure mean (not shown) as small as possible. This provides an arrangement in which the electrical cable and water line can be separated, which is desirable, in a relatively easy operation by flexing the side arms 220 and 222 and inserting the separator. No fiddly nuts or bolts, which may become loose and damage cables are required. The overall width of the link is not increased significantly, indeed, the link is thinner than the tri-pull shown in FIG. 7, which is important as there is limited space in the channels in which such chain links run.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A link of a chain link for protecting cables, service lines comprising:
   a body portion having a first wall and two opposed side arms integral with the first wall extending away from one side of the first wall and defining a first channel for receiving at least one service line, the side arms having free ends and being capable of being deflected, the side arms defining first engaging formations; and
   a closure means defining an end wall, the end wall defining complementary engaging formations to the first engaging formations for interlocking the end wall to the body portion characterised in that the engaging formations are positioned such that the side arms of the body portion are deflected towards each other to disengage the closure means from the body portion and wherein
   a second pair of opposed side arms extend away from the opposite side of the first wall of the body portion to the one side, so as to define a second channel for receiving a service line on the opposite side of the first wall, the second pair of side arms having free ends and being capable of being deflected, the second pair of side arms also defining first engaging formations; and
   a second closure means defining an end wall, the end wall defining complementary engaging formations to the first engaging formations for interlocking the end wall to the body portion characterised in that the engaging formations are arranged such that the second pair of side arms of the body portion are deflected towards each other to disengage the second closure means from the body portion.

2. A link as claimed in claim 1 wherein the first wall of the body portion and the end wall of the closure means define linkage elements for linking the link to a similar link.

3. A link as claimed in claim 2 wherein the body portion and closure means comprise a moulded plastics material and the linkage elements comprise a metal insert.

4. A link as claimed in claim 3 wherein the plastics material is nylon and the metal insert is steel.

5. A link as claimed in claim 2 when dependent on claim 1 wherein two parallel offset linkage elements are encased in the first wall of the body portion and one offset linkage element is defined in the end wall of each closure element.

6. A link as claimed in claim 1 wherein two parallel offset linkage elements are encased in the first wall of the body portion and one or two parallel offset linkage elements are defined in the end wall of the closure element.

7. A link as claimed in claim 1 wherein the end wall of the closure means defines short side arms which are shorter than the opposed side arms of the body portion and define free ends on which the complementary engaging formations are defined.

8. A link as claimed in claim 1 wherein the first engaging formations include a slot defined in the free end of each of the two opposed side arms and the complementary engaging formations include a tongue defined at the free end of the short side arm.

9. A link as claimed in claim 8 wherein the slot and tenon are inwardly tapered.

10. A link as claimed in claim 8 wherein the engaging formations further include a channel extending transversely across the width of one of the short side arms of the closure means and a depending rib extending transversely across the width of the opposed side arms.

11. A link as claimed in claim 10 wherein the channel is defined on the side walls adjacent the rebate.

12. A link as claimed in claim 6 wherein a separator is provided which snap-fits or push fits into the first channel to separate two cables in the first channel.

13. A link as claimed in claim 12 wherein the separator has a generally hour glass shaped cross-section being narrower at its middle than its top and bottom.

14. A link of a chain link for protecting cables and service lines and comprising:
   a body portion having a first wall and two opposed side arms integral with the first wall extending away from one side of the first wall and defining at least one channel for receiving at least one service line, the side arms having free ends and being capable of being deflected, the side arms defining first engaging formations; and
   a closure means defining an end wall, the end wall defining short side arms and complementary engaging formations to the first engaging formations for interlocking the end wall to the body portion;
   wherein the first engaging formations include a slot defined in the free end of each side arm of the body portion and the complementary engaging formations include a tongue defined at the free end of each short side arm of the closure means;
   and further including a recess extending transversely across the width of at least one of the shorter side arms and the side walls and a protrusion which locates in the recess extending transversely across the width of at least one of the shorter side arms and the side walls.

15. A link as claimed in claim 14 wherein the channel is defined on the short side arm adjacent the slot.

16. A link as claimed in claim 14 wherein the slot and tenon are tapered.

17. A link as claimed in claim 14 wherein a second pair of opposed side arms extend away from the opposite side of the first wall of the body portion to the one side, so as to define a second channel for receiving a service line on the opposite side of the first wall, the second pair of side arms having free ends and being capable of being deflected, the second pair of side arms also defining first engaging formations; and
   a second closure means defining an end wall, the end wall defining complementary engaging formations to the first engaging formations for interlocking the end wall to the boy portion:
   wherein the first engaging formations include a slot defined in the free end of each side arm and the complementary engaging formations include a tenon defined at the free end of each relatively shorter side arm;
   and further including a channel extending transversely across the width of one of the shorter side arms or the side walls and a depending rib extending transversely across the width of the other of the shorter side arms or the side walls.

18. An articulated cable handler for protecting cables and service lines comprising a plurality of interconnected links, said links comprising:
   a body portion having a first wall and two opposed side arms integral with the first wall extending away from one side of the first wall and defining at least one channel for receiving at least one service line, the side arms having free ends and being capable of being deflected, the side arms defining first engaging formations; and
   a closure means defining an end wall, the end wall defining complementary engaging formations to the first engaging formations for interlocking the end wall to the body portion characterised in that the engaging formations are arranged such the side arms of the body portion are deflected towards each other to disengage the closure means from the body portion; and wherein the first wall of the body portion and the end wall of the or each closure means define linkage elements for linking the link to a similar link.

19. A link as claimed in claim 18 wherein two parallel offset linkage elements are encased in the first wall of the body portion and one or two parallel cranked offset elements are defined in the end wall of the closure element.

20. A link as claimed in claim 1 wherein the first wall of the body portion and the end wall of the closure means define linkage elements for linking the link to a similar link.

21. A link as claimed in claim 1 wherein a separator is provided which snap-fits or push fits into said first channel to separate two cables in said first channel.

22. A link as claimed in claim 21 wherein one or more notches are defined in the side arms of the first channel and one or more protrusions are defined by the cable separator which snap or push fit into the notches and wherein the separator has a generally hour glass shaped cross-section.

23. A link as claimed in claim 14 wherein the opposed side arms are flexible, being formed from a moulded plastics material.

24. A link as claimed in claim 14 wherein a separator is provided which snap-fits or push fits into said channel to separate two cables in said first channel.

25. A link as claimed in claim 24 wherein one or more notches are defined in the side arms of the channel and one or more protrusions are defined by the cable separator which snap or push fit into the notches and wherein the separator has a generally hour glass shaped cross-section.

26. A link as claimed in claim 18 wherein the opposed side arms are flexible, being formed from a moulded plastics material.

27. A link as claimed in claim 18 wherein a separator is provided which snap-fits or push fits into said at least one channel to separate two cables in said channel.

28. A link as claimed in claim 18 wherein one or more notches are defined in the side arms of said at least one channel and one or more protrusions are defined by the cable separator which snap or push fit into the notches and wherein the separator has a generally hour glass shaped cross-section.

* * * * *